US006801419B2

(12) United States Patent
Fukui

(10) Patent No.: US 6,801,419 B2
(45) Date of Patent: Oct. 5, 2004

(54) OVERCURRENT PROTECTION CIRCUIT FOR VOLTAGE REGULATOR

(75) Inventor: Atsuo Fukui, Chiba (JP)

(73) Assignee: Seiko Instruments Inc., Chiba (JP)

( * ) Notice: Subject to any disclaimer, the term of this patent is extended or adjusted under 35 U.S.C. 154(b) by 23 days.

(21) Appl. No.: 10/177,836

(22) Filed: Jun. 21, 2002

(65) Prior Publication Data

US 2003/0011952 A1 Jan. 16, 2003

(51) Int. Cl.[7] .................................................. H02H 3/08
(52) U.S. Cl. ...................................................... 361/93.1
(58) Field of Search ........................... 361/93.1, 88, 78, 361/52, 57; 327/541

(56) References Cited

U.S. PATENT DOCUMENTS 5,570,060 A * 10/1996 Edwards ..................... 327/541

* cited by examiner

*Primary Examiner*—Brian Sircus
*Assistant Examiner*—James A Demakis
(74) *Attorney, Agent, or Firm*—Adams & Wilks

(57) ABSTRACT

A voltage regulator is provided in which an abnormal operation of an overcurrent protection circuit is prevented. The voltage regulator makes operating states of a PMOS output driver transistor and a first PMOS sense transistor always the same to set a ratio of currents flowing to the transistors equal to a transistor size ratio thereof, thereby solving the problem that a load current under which an overcurrent protection operates becomes inaccurate by the decrease in an output voltage due to an abnormal operation of an overcurrent protection circuit in the case in which a different of an input voltage VIN and an output voltage VOUT is small and the influence of channel length modulation in the case in which the difference of an input voltage VIN and an output voltage VOUT is large.

9 Claims, 4 Drawing Sheets

OVERCURRENT PROTECTION CIRCUIT FOR VOLTAGE REGULATOR

BACKGROUND OF THE INVENTION

1. Field of the Invention

The present invention relates to an overcurrent protection circuit for a voltage regulator.

2. Description of the Related Art

FIG. 3 shows a configuration of a conventional overcurrent protection circuit for a voltage regulator. A reference voltage source 101 supplies a constant-voltage Vref to an inverted input terminal of an error amplifier 102. An output of the error amplifier 102 is connected to a gate of a PMOS output driver transistor 105, and is also connected to a gate of a first PMOS sense transistor 106 and a drain of a PMOS transistor 107 of an overcurrent protection circuit 103. A source of the PMOS output driver transistor 105 is connected to an input terminal IN and a drain of the same is connected to an output terminal OUT. A load resistor 114, a capacitor 113 and a voltage dividing circuit 104 consisting of resistors 111 and 112 are connected to the output terminal OUT. The voltage dividing circuit 104 supplies a divided voltage of an output voltage VOUT to a non-inverted input terminal of the error amplifier 102.

The overcurrent protective circuit 103 is constituted by the first PMOS sense transistor 106, the PMOS transistor 107, an NMOS transistor 108 and resistors 109 and 110. In the case in which the PMOS output driver transistor 105 and the first PMOS sense transistor 106 are both operating in a saturated state, a current proportional to a current flowing to the PMOS output driver transistor 105 flows to the first PMOS sense transistor 106. In this case, the proportion is substantially equal to a transistor size ratio of the transistors.

The case will be considered in which the PMOS output driver transistor 105 and the first PMOS sense transistor 106 are operating in the saturated state. If an amount of current supplied by the PMOS output driver transistor 105 to the load 114 is little, a current flowing to the first PMOS sense transistor 106 is small in proportion to it. Thus, a voltage difference generated at both ends of the resistor 109 is also small and the NMOS transistor 108 is in a non-conduction state. Therefore, since a current does not flow to the NMOS transistor 108, a voltage difference is not generated at both ends of the resistor 110 and the PMOS transistor 107 is also in a non-conduction state.

However, when a current supplied by the PMOS output driver transistor 105 to the load 114 increases, a current flowing to the first PMOS sense transistor 106 also increases in proportion to it and a voltage generated at both ends of the resistor 109 also increases. Thus, the NMOS transistor 108 in a conductive state. When the NMOS transistor 108 becomes conductive and a voltage difference generated at both the ends of the resistor 110 increases, the PMOS transistor 107 conducts to increase a gate voltage of the PMOS output driver transistor 105. Thus, a driving ability of the PMOS output driver transistor 105 decreases and an output voltage OUT falls. FIG. 4 shows this state. In this way, elements are prevented from being destroyed by an overload current.

In the circuit shown in FIG. 3, when a difference between the input voltage VIN and the output voltage VOUT is small, the PMOS output driver transistor 105 is unsaturated. However, the first PMOS sense transistor 106 is operating in the saturated state. Then, since the operating states of the PMOS output driver transistor 105 and the first PMOS sense transistor 106 are different, a ratio of currents flowing to the transistors is different from a transistor size ratio thereof. A current flowing to the first PMOS sense transistor 106 is larger than a current value that is found from the transistor size ratio of the PMOS output driver transistor 105 and the first PMOS sense transistor 106 and a current flowing to the PMOS output driver transistor 105.

That is, when the PMOS output driver transistor is unsaturated, a current flowing to the first PMOS sense transistor 106 increases even if a load current is small. At this time, as described above, the PMOS transistor 107 conducts to increase a gate voltage of the PMOS output driver transistor 105. Thus, there are disadvantages in that an abnormal operation occurs in the overcurrent protection circuit 103 such as a decreasing driving ability of the PMOS output driver transistor 105 and the fall of an output voltage OUT is more conspicuous compared with a case in which the overcurrent protection circuit 103 is not provided. FIG. 5 shows this state.

In addition, even in the case in which a difference between the input voltage VIN and the output voltage VOUT is large and both the PMOS output driver transistor 105 and the first PMOS sense transistor 106 are both operating in the saturated state, since source-to-drain voltages of the transistors are different from each other, a ratio of currents flowing to them is different from a transistor size ratio thereof due to an influence of channel length modulation. As a result, there is a disadvantage in that a load current under which the overcurrent protection operates becomes inaccurate.

SUMMARY OF THE INVENTION

In the present invention, operating states of a PMOS output driver transistor and a first PMOS sense transistor are always made the same to set a ratio of currents flowing to both the transistors equal to a transistor size ratio. Consequently, the present invention solves the problem that a load current under which an overcurrent protection operates becomes inaccurate by a decrease in an output voltage due to an abnormal operation of an overcurrent protection circuit in the case in which a difference of an input voltage VIN and an output voltage VOUT is small, and due to the influence of channel length modulation in the case in which the difference of an input voltage VIN and an output voltage VOUT is large.

DETAILED DESCRIPTION OF THE PREFERRED EMBODIMENTS

In the present invention, a drain voltage of a first PMOS sense transistor is always set equal to an output voltage VOUT, whereby operating states of a PMOS output driver transistor and the first PMOS sense transistor become the same. Thus, a ratio of currents flowing to the transistors is equal to a transistor size ratio thereof.

(Embodiment)

Embodiments of the present invention will be hereinafter described with reference to the drawings.

Figure 1:
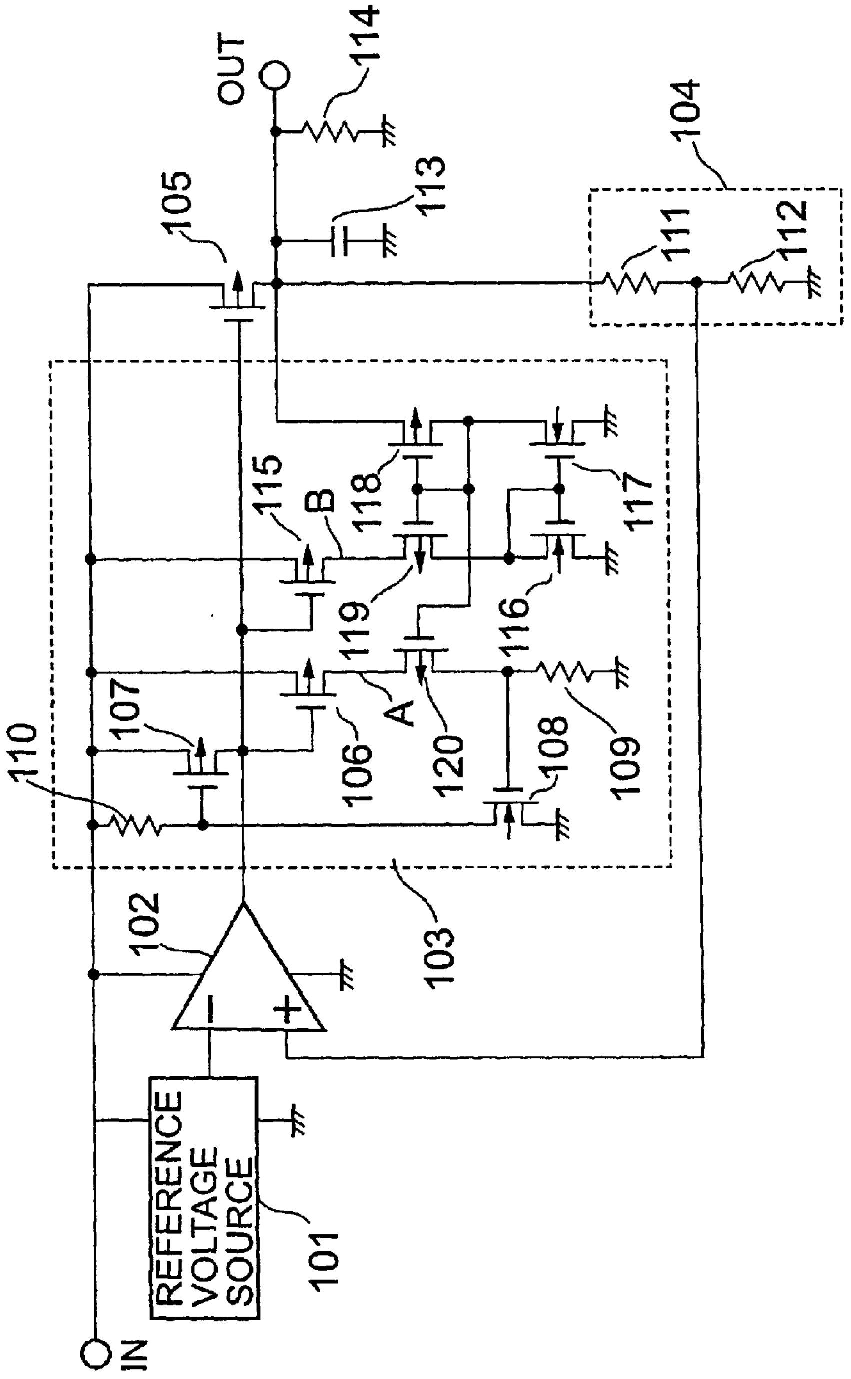
FIG. 1 is a circuit diagram of a voltage regulator having an overcurrent protection circuit of a first embodiment of the present invention.

FIG. 1 shows a voltage regulator of a first embodiment of the present invention. The circuit of the voltage regulator is the same as the conventional circuit shown in FIG. 3 except that a configuration of an overcurrent protection circuit 103 is different.

Figure 3:
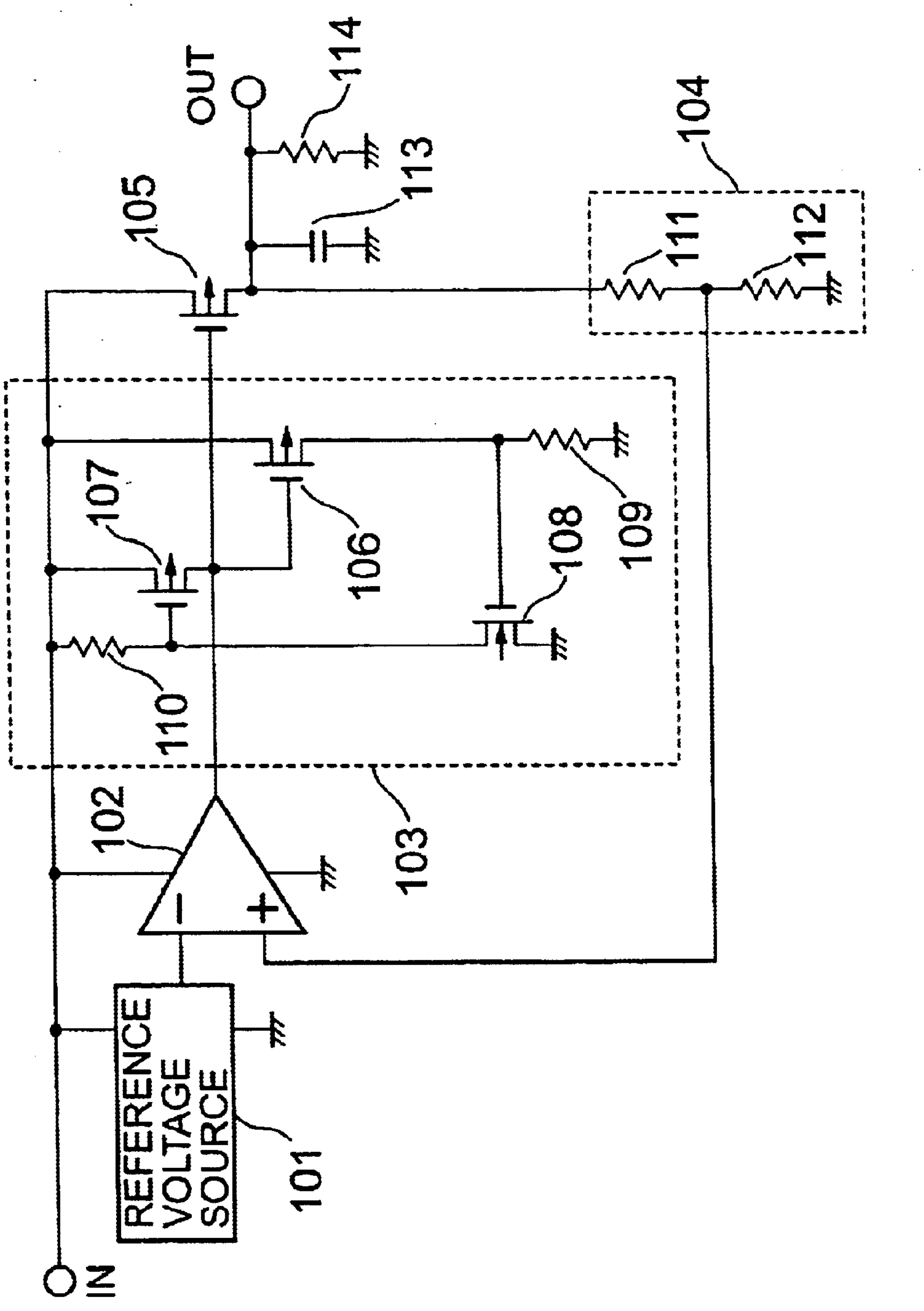
FIG. 3 is a circuit diagram of a voltage regulator having a conventional overcurrent protection circuit.

In the overcurrent protection circuit 103 of this embodiment, a second PMOS sense transistor 115, a first PMOS level shifter 120, a second PMOS level shifter 119, a third PMOS level shifter 118 and NMOS transistors 116 and 117 forming a current mirror circuit are further provided to the conventional overcurrent protection circuit 103 shown in FIG. 3. A source of the first PMOS level shifter 120 is connected to a drain of the first sense transistor 106, and a drain of the first level shifter 120 is connected to one end of the resistor 109 and a gate of the NMOS transistor 108. A drain of the second PMOS sense transistor 115 is connected to a source of the second PMOS level shifter 119, and a drain of the second level shifter 119 is connected to a gate and a drain of the NMOS transistor 116 and a gate of the NMOS transistor 117, which form the current mirror circuit. A drain of the NMOS transistor 117 is connected to a gate and a drain of the third PMOS level shifter 118 and gates of the first PMOS level shifter 120 and the second PMOS level shifter 119. A source of the third PMOS level shifter 118 is connected to an output terminal OUT.

For simplicity, a case will be described in which the first PMOS sense transistor 106 and the second PMOS sense transistor 115 have the same transistor size. When the first PMOS sense transistor 106 and the second PMOS sense transistor 115 have the same transistor size, since gate-to-source voltages of the transistors are equal and voltages at a point A and a point B are equal as discussed below, source-to-drain voltages of the same becomes equal as well. Thus, currents flowing to the transistors become equal. Since a current flowing to the second PMOS sense transistor 115 is biased by a current mirror, which is formed by the NMOS transistors 116 and 117, a current flowing to the NMOS transistor 117 becomes equal to the current flowing to the second PMOS sense transistor 115. Accordingly, the currents flowing to the first PMOS sense transistor 106, the second PMOS sense transistor 115 and the NMOS transistor 117 are equal, and thus currents flowing to the first PMOS level shifter 120, the second PMOS level shifter 119 and the third PMOS level shifter 118 becomes equal as well. Therefore, a gate-to-source voltage of the first PMOS level shifter 120, a gate-to-source voltage of the second PMOS level shifter 119 and a gate-to-source voltage of the third PMOS level shifter 118 becomes equal to each other. Incidentally, since the source of the third PMOS level shifter 118 is connected to the output terminal OUT, a source voltage of the third PMOS level shifter 118 is equal to an output voltage VOUT. As described above, since the gate-to-source voltages of the first, second and third PMOS level shifters are equal, the voltages at the point A and the point B become substantially equal to the output voltage VOUT.

Even if the transistor sizes of the first PMOS sense transistor 106 and the second PMOS sense transistor are different from each other, it is obvious that the gate-to-source voltages of the first, second and third PMOS level shifters can be set equal. Therefore, even if the transistor sizes of the first PMOS sense transistor 106 and the second PMOS sense transistor 115 are different, it is possible to set the voltages at the point A and the point B substantially equal to the output voltage VOUT.

As described above, since the source-to-drain voltages of the PMOS output driver transistor 105 and the first PMOS sense transistor 106 are substantially equal and the source-to-gate voltages of the same are also equal, operating states of the transistors become the same regardless of a magnitude of the difference between the input voltage VIN and the output voltage VOUT. That is, a ratio of the currents flowing to the PMOS output driver transistor 105 and the first PMOS sense transistor 106 is equal to a transistor size ratio thereof. It is needless to mention that there is no influence of channel length modulation because of the source-to-drain voltage of the transistors being equal to each other.

Figure 5:
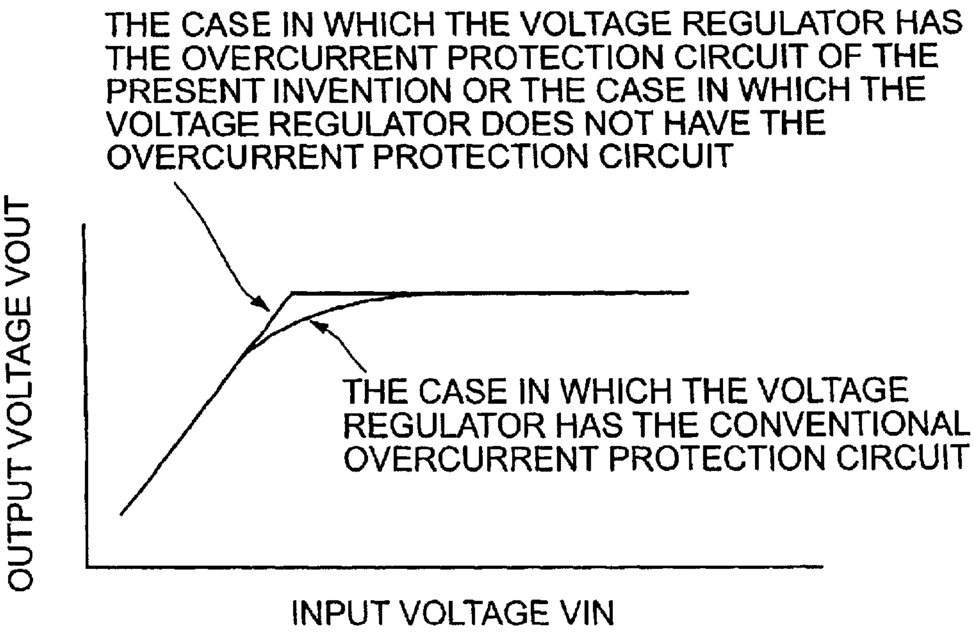
FIG. 5 is a graph showing a relationship between an input voltage and an output voltage of the voltage regulator having the overcurrent protection circuit of the first embodiment or the second embodiment of the present invention, and also showing a relationship between an input voltage and an output voltage of the voltage regulator having the conventional overcurrent protection circuit.

A case will be considered more specifically, in which the difference between the input voltage VIN and the output voltage VOUT is small. Since the difference between the input voltage VIN and the output voltage VOUT is small, the PMOS output driver transistor 105 operates in the unsaturated state. However, since the first PMOS sense transistor 106 is unsaturated as well and the source-to-drain voltages of the transistors are equal, a ratio of the currents flowing to the PMOS output driver transistor 105 and the first PMOS sense transistor 106 substantially depends on a transistor size ratio thereof. Therefore, it is possible to avoid a phenomenon that the output voltage OUT falls by the overcurrent protection circuit operating abnormally when the difference between the input voltage VIN and the output voltage VOUT is small. FIG. 5 shows this state.

In addition, if the difference between the input voltage VIN and the output voltage VOUT is large and the PMOS output driver transistor 105 is operating in the saturated state, the first PMOS sense transistor 106 is also operating in the saturated state and the source-to-drain voltages of the transistors are equal. Thus, since it is obvious that no influence of channel length modulation is involved and the ratio of currents flowing to the PMOS output driver transistor 105 and the first PMOS sense transistor 106 depends on the transistor size ratio thereof, the load current under which the overcurrent protection functions can be set accurately.

Figure 4:
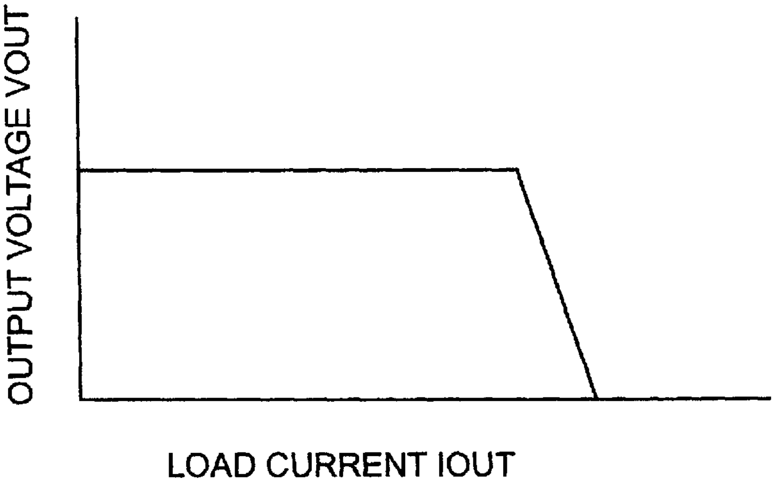
FIG. 4 is a graph showing a relationship between a load current and an output voltage.

If an overcurrent flows to the load current 114, the current flowing to the first PMOS sense transistor 106 also increases, a voltage difference generated at both ends of the resistor 109 becomes large and the NOMS transistor 108 becomes conductive. When the NMOS transistor 108 becomes conductive and the voltage difference generated at both ends of the resistor 110 becomes large, the PMOS transistor 107 conducts to increase the gate voltage of the PMOS output driver transistor 105. Thus, the driving ability of the PMOS output driver transistor 105 decreases. Therefore, the output voltage VOUT falls and the protection against an overcurrent of a load is performed as in the conventional overcurrent protection circuit. FIG. 4 shows the state.

Figure 2:
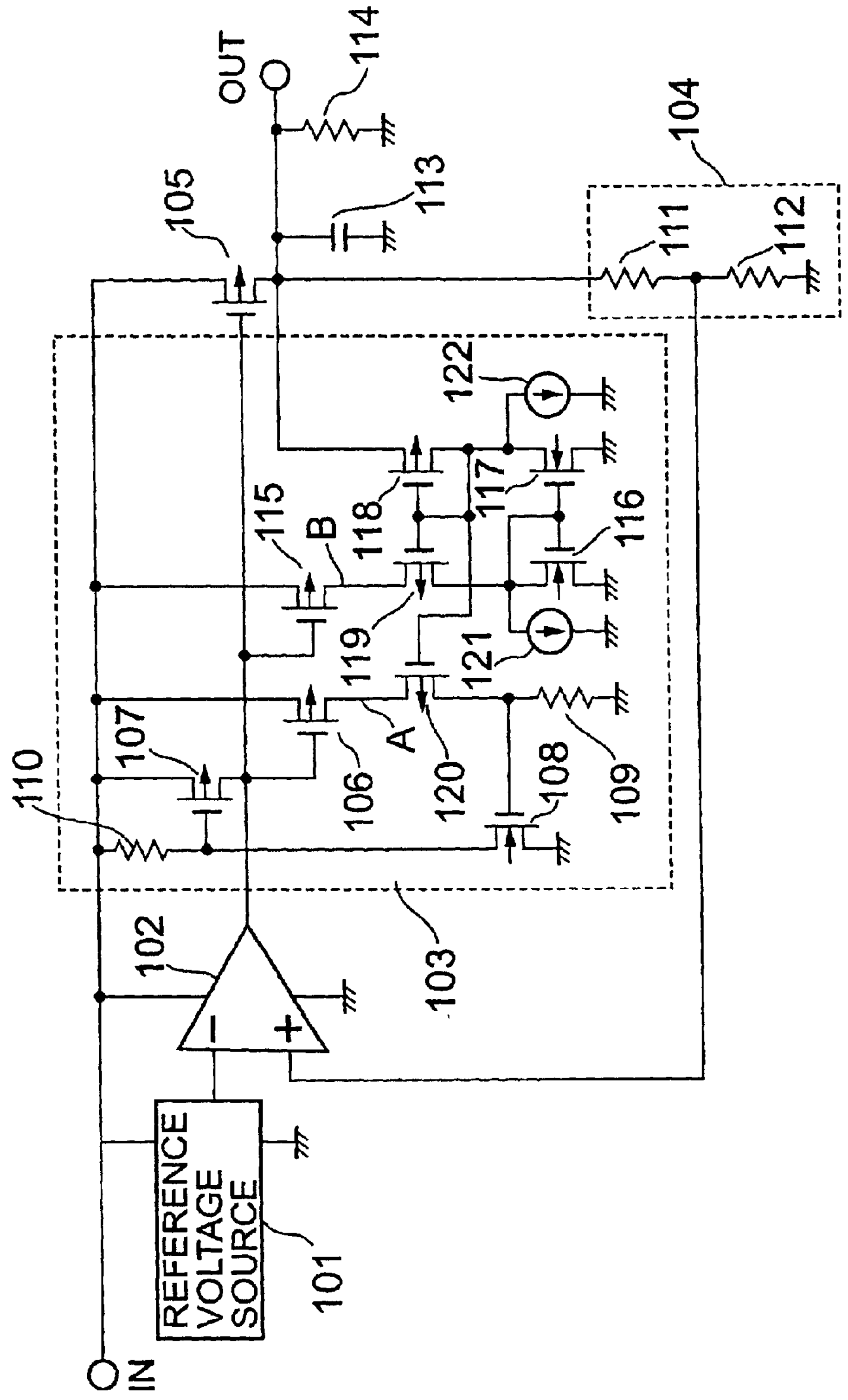
FIG. 2 is a circuit diagram of a voltage regulator having an overcurrent protection circuit of a second embodiment of the present invention.

FIG. 2 shows a voltage regulator of a second embodiment of the present invention. In the second embodiment, constant-current sources 121 and 122 are added to the overcurrent protection circuit of the first embodiment. Since the currents flowing to the second lever shifter 119 and the third level shifter 118 are the same as those in the first embodiment even if the constant-current sources 121 and 122 are added, it is obvious that the same effects as the first embodiment can be obtained.

Thus, it is seen that an overcurrent protection circuit for a voltage regulator is provided. One skilled in the art will appreciate that the present invention can be practiced by other than the preferred embodiments which are presented for the purposes of illustration and not of limitation, and the present invention is limited only by the claims which follow.

In the present invention, operating states of the PMOS output driver transistor and the first PMOS sense transistor are always made the same to set a ratio of currents flowing to both the transistors equal to a transistor size ratio thereof. Consequently, the present invention has an effect that a load current under which the overcurrent protection operates can be set accurately by preventing the decrease in an output voltage due to an abnormal operation of an overcurrent protection circuit in the case in which a difference of an input voltage VIN and an output voltage VOUT is small and the influence of channel length modulation in the case in which the difference of an input voltage VIN and an output voltage VOUT is large.

What is claimed is:

1. An overcurrent protection circuit for a voltage regulator, comprising: an output driver transistor for supplying an output current to a load; a first PMOS sense transistor having a gate connected to an output of an error amplifier of the voltage regulator and a source connected to an input terminal of the voltage regulator for detecting the output current supplied to the load and outputting a signal for controlling the output driver transistor to limit the output current; a first resistor having a first end and a second end, the second end being connected to a ground terminal; a first NMOS transistor having a gate connected to the first end of the first resistor; a second resistor having a first end connected to a drain of the first NMOS transistor and a second end connected to the input terminal of the voltage regulator; a PMOS transistor having a gate connected to the first end of the second resistor, a source connected to the input terminal of the voltage regulator, and a drain connected to the output of the error amplifier of the voltage regulator; a second PMOS sense transistor having a gate connected to the output of the error amplifier of the voltage regulator and a source connected to the input terminal of the voltage regulator; a first PMOS level shifter having a source connected to a drain of the first PMOS sense transistor and a drain connected to the first end of the first resistor and the gate of the first NMOS transistor; a second NMOS transistor having a source connected to the ground terminal; a second PMOS level shifter having a source connected to a drain of the second PMOS sense transistor and a drain connected to a gate and a drain of the second NMOS transistor; a third NMOS transistor having a drain connected to gates of the first PMOS level shifter and the second PMOS level shifter, a gate connected to the gate and the drain of the second NMOS transistor, and a source connected to the ground terminal; and a third PMOS level shifter having a gate and a drain connected to a drain of the third NMOS transistor and a source connected to the output terminal of the voltage regulator; wherein operating states of the output driver transistor and the first sense transistor are always the same during operation of the voltage regulator.

2. An overcurrent protection circuit according to claim 1; wherein a drain voltage of the first sense transistor is set equal to an output voltage of the voltage regulator in order to set source-to-drain voltages of the output driver transistor and the first sense transistor so that operating states of the output driver transistor and the first sense transistor are always the same.

3. An overcurrent protection circuit according to claim 1; wherein the output driver transistor comprises a PMOS transistor having a source connected to the input terminal of the voltage regulator and a drain connected to the output terminal of the voltage regulator.

4. A voltage regulator for supplying a regulated voltage to a load, comprising: external connection terminals including an input terminal for inputting an input voltage, a reference potential terminal, and an output terminal for outputting a regulated output voltage relative to the reference potential terminal; an output driver transistor connected to the output terminal; a voltage divider connected to the output terminal for dividing the output voltage and producing a divided voltage; an error amplifier for comparing the divided voltage to a reference voltage and outputting an error signal to the output driver transistor to control a level of the regulated output voltage; a load resistor and an output capacitor connected in parallel between the output terminal and the reference potential terminal; and an overcurrent protection circuit for limiting an output current of the voltage regulator, the overcurrent protection circuit comprising a first sense transistor for detecting a current supplied to the load and outputting a signal for controlling the output driver transistor to limit an output current, operating states of the output driver transistor and the first sense transistor always being the same during operation of the voltage regulator.

5. A voltage regulator according to claim 4; wherein the output driver transistor comprises a PMOS transistor having a source connected to the input terminal and a drain connected to the output terminal.

6. A voltage regulator according to claim 4; wherein the first sense transistor is a PMOS transistor having a gate connected to an output of the error amplifier; and the overcurrent protection circuit further comprises a first resistor having a first end connected to a source or drain of the first sense transistor and a second end connected to the reference potential terminal; a first NMOS transistor having a gate connected to the first end of the first resistor; a second resistor having a first end connected to a source or drain of the first NMOS transistor a second end connected to the input terminal; a PMOS transistor having a gate connected to the first end of the second resistor, one of a source or drain connected to the input terminal, and the other of a source or drain connected to a gate of the first PMOS sense transistor; a second PMOS sense transistor having a gate connected to the output of the error amplifier and a source connected to the input terminal; a first PMOS level shifter having a source connected to a drain of the first PMOS sense transistor and a drain connected to the first end of the first resistor and a gate of the first NMOS transistor; a second NMOS transistor having a source and a drain connected between the first PMOS level shifter and the reference potential terminal; a second PMOS level shifter having a source connected to a drain of the second PMOS sense transistor and a drain connected to a gate and a drain of the second NMOS transistor; a third NMOS transistor having a drain connected to gates of the first PMOS level shifter and the second PMOS level shifter; and a third PMOS level shifter having a gate and a drain connected to a drain of the third NMOS transistor and a source connected to the output terminal.

7. A voltage regulator for supplying a regulated voltage to a load, comprising: external connection terminals including an input terminal for inputting an input voltage, a reference potential terminal, and an output terminal for outputting a regulated output voltage relative to the reference potential terminal; an output driver transistor connected to the output terminal; a voltage divider connected to the output terminal for dividing the output voltage and producing a divided voltage; an error amplifier for comparing the divided voltage to a reference voltage and outputting an error signal to the output driver transistor to control a level of the regulated output voltage; and an overcurrent protection circuit for limiting an output current of the voltage regulator, the overcurrent protection circuit comprising a first PMOS sense transistor having a gate connected to an output of the error amplifier for detecting a current supplied to the load and outputting a signal for controlling the output driver transistor to limit an output current, a first resistor having a first end and a second end, the second end being connected to the reference potential terminal, a first NMOS transistor having a gate connected to the first end of the first resistor, a second resistor having a first end connected to a drain of the first NMOS transistor and a second end connected to the input terminal, a PMOS transistor having a gate connected to the first end of the second resistor, a connected to the input terminal, and a drain connected to the output of the error amplifier, a second PMOS sense transistor having a gate connected to the output of the error amplifier and a source connected to the input terminal, a first PMOS level shifter having a source connected to a drain of the first PMOS sense transistor and a drain connected to the first end of the first resistor and the gate of the first NMOS transistor, a second NMOS transistor having a source connected to the reference potential terminal, a second PMOS level shifter having a source connected to a drain of the second PMOS sense transistor and a drain connected to a gate and a drain of the second NMOS transistor, a third NMOS transistor having a drain connected to gates of the first PMOS level shifter and the second PMOS level shifter, a gate connected to the gate and the drain of the second NMOS transistor, and a source connected to the reference potential terminal, and a third PMOS level shifter having a gate and a drain connected to a drain of the third NMOS transistor and a source connected to the output terminal; whereby operating states of the output driver transistor and the first sense transistor are always the same during operation of the voltage regulator.

8. A voltage regulator according to claim 7; wherein the output driver transistor comprises a PMOS transistor having a source connected to the input terminal and a drain connected to the output terminal.

9. A voltage regulator according to claim 7; further comprising a load resistor and an output capacitor connected in parallel between the output terminal and the reference potential terminal.

* * * * *